Aug. 21, 1956 C. H. HULL 2,759,408
TRACTOR IMPLEMENT LINKAGES
Filed Oct. 25, 1954 2 Sheets-Sheet 1

Inventor
Charles Hartley Hull
By
Attorneys.

United States Patent Office 2,759,408
Patented Aug. 21, 1956

2,759,408

TRACTOR IMPLEMENT LINKAGES

Charles H. Hull, Meltham, Huddersfield, England, assignor to David Brown Tractors (Engineering) Limited, Meltham, Huddersfield, England Application October 25, 1954, Serial No. 464,571

2 Claims. (Cl. 97—47.36)

The invention relates to a linkage for attaching agricultural implements to draft vehicles, particularly light rear-engined tractors having implements mounted substantially beneath the forward part of the tractor and wherein the operator is seated towards the rear of the vehicle in such a position as to have a view of the implement or implements, when at work, restricted only by a forwardly extending frame member or members supporting the front axle; such tractors being, by the provision of means for adjusting the track width, adaptable for rowcrop work such as is encountered in market gardening.

Figure 1:
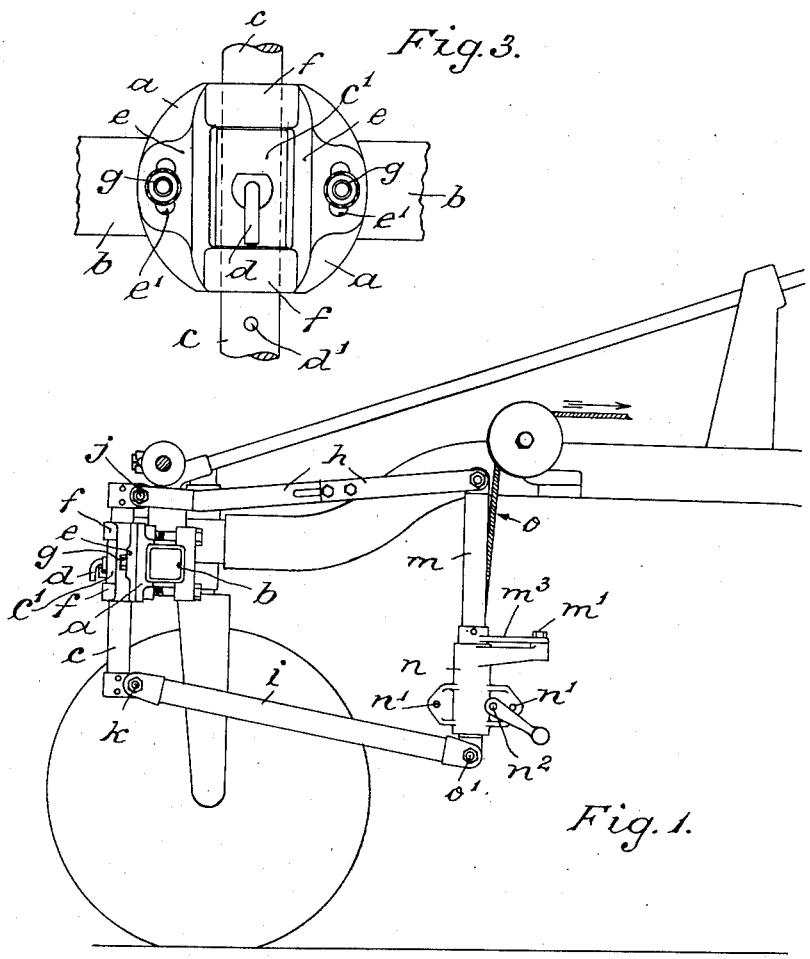
Figure 2:
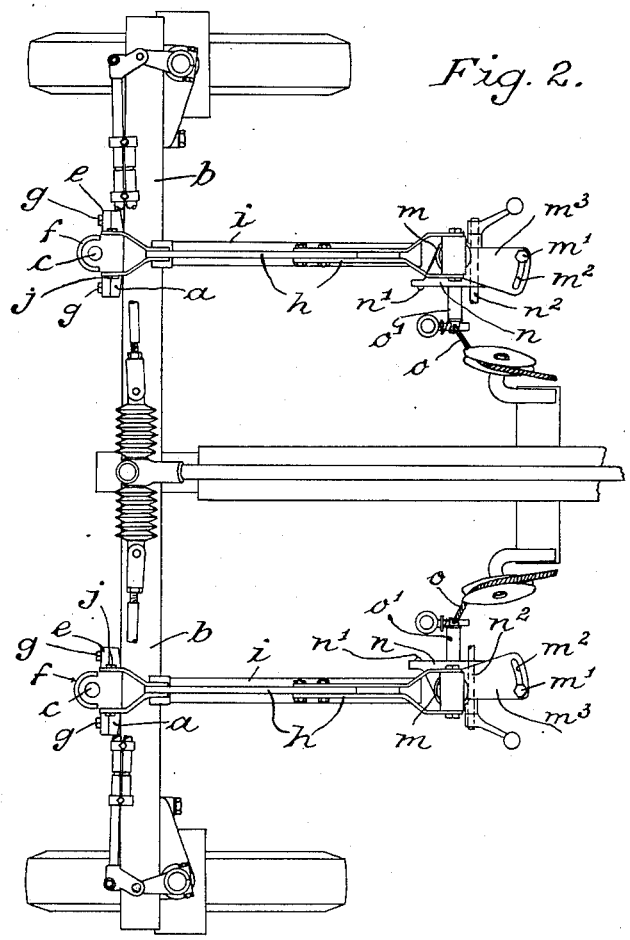

A preferred embodiment of the present invention is shown in the accompanying drawings, in which Fig. 1 is a side elevation; Fig. 2 is a plan view; and Fig. 3 is a detail, on a somewhat enlarged scale, which is hereinafter referred to.

The linkage consists of two substantially identical arrangements differing only in being left and right handed, mounted in brackets $a$, $a$ adjustable in position along the length of the front axle beam $b$ of the tractor, which is preferably of square section. A member $e$ having thereon spaced lugs $f$, $f$ in which there is freely journaled for rotary movement a vertical pillar $c$ extending above and below the axle beam $b$, is adjustably clamped to each bracket $a$ by two nuts $g$, $g$ on studs engaging in arcuate slots $e^1$, $e^1$ in said member $e$, as best seen in Fig. 3, thereby providing for independent slight angular adjustment of the pillars $c$, $c$ in a vertical plane parallel to the front axle beam. Each pillar $c$ is also adjustable vertically, it being held in adjusted vertical position while in use, without interfering with the rotary movement thereof, by means of a pin $d$ inserted through diametrically-opposed holes in a sleeve $c^1$ surrounding the said pillar and located substantially without end play between the lugs $f$, $f$, and through one of a series of vertically spaced holes such as $d^1$ drilled through the pillar $c$. Two rearwardly extending arms $h$, $i$ are pin-jointed at $j$, $k$ respectively to the opposite ends of each pillar $c$, and a further substantially vertical link $m$ is likewise pivotally connected at its ends to the rear ends of these arms $h$, $i$ and carries a part or bracket $n$ angularly adjustable about the longitudinal axis of the link $m$ and which can be clamped by means of a set-screw $m^1$ in any desired position within the limits of an arcuate slot $m^2$ in a plate $m^3$ fixed to the link $m$. It is to this bracket $n$ that a tool-bar end or an independent implement is attached, being located on two projections $n^1$, $n^1$ and clamped by a head not shown on the inner end of a bolt $n^2$.

To ensure that any implement can swing laterally in such a manner as to follow correctly the path of the tractor, the pillars $c$, $c$ previously referred to are mounted sufficiently forward of the front axle beam to permit the use of relatively long rearwardly extending arms $h$, $i$ without necessitating a long tractor wheel base.

Each linkage is pivotally raised about the two forward pin-joints $j$, $k$ by a cable $o$ or equivalent means suitably connected to some rearward part of the linkage, preferably the lower rear pin-joint $o^1$, and the two linkage arrangements may be raised together or individually by any suitable hand or power-operated means. Thus a tool-bar connected at or near its ends to the two linkages may be raised and lowered as a unit, while a plough body or other implement may be affixed to each linkage and raised or lowered independently of its fellow.

When plough bodies are individually mounted on each linkage as just described, the further advantage becomes apparent that the width of furrow being ploughed may readily be varied by appropriate angular adjustment of the brackets $n$, $n$ mounted on the rearward substantially vertical links $m$, $m$ and rigidly carrying the plough bodies. Furthermore, suitable angular adjustment of the said brackets enables the line of draft of each linkage to be advantageously adjusted to suit various types of plough bodies and various soil conditions. Again, so-called "one-way" ploughing can be carried out in a simple manner by attaching a left hand and a right hand plough body to the appropriate linkages and holding each one out of work in turn by individual control of the two linkage systems.

Thus there is provided a tractor-implement linkage of novel construction in which lifting and lowering of two similar linkage arrangements can be advantageously effected independently or co-operatively.

Although we have referred above to the linkages as being mounted on the front axle beam of the tractor, they may if desired be carried by and adjustably spaced along a transverse member located in any other position on a tractor vehicle.

The embodiments of the invention in which an exclusive property or privilege is claimed are defined as follows:

1. Means for connecting an agricultural implement to a tractor comprising, in combination, a transverse member on the tractor, a bracket adjustable laterally on said member, a part adjustable angularly on said bracket, a pair of vertically spaced lugs on said angularly adjustable part and having aligned vertical holes extending therethrough, a sleeve fitting between said lugs and having diametrically-opposed holes therein, a vertical pillar extending through said sleeve and through the aligned holes in said lugs and adjustable rotatably and vertically therein, said pillar having a series of vertically spaced holes therein, a locking pin adapted to extend removably through the diametrically-opposed holes in said sleeve and through any one of said vertically spaced holes in said pillar, and an implement carrying linkage comprising a pair of arms connected respectively to the upper and lower ends of said pillar and extending rearwardly therefrom and pivotal in a vertical plane, a link connecting pivotally the rear ends of said arms, and a part angularly adjustable about said link and having means for attaching an implement thereto.

2. Means for connecting agricultural implements to a tractor comprising, in combination, a transverse member on the tractor, a pair of brackets adjustable laterally on said member, a part adjustable angularly on each of said brackets, a pair of vertically spaced lugs on each of said angularly adjustable parts and having aligned vertical holes extending therethrough, a sleeve fitting between the pair of lugs on each of said parts and having diametrically-opposed holes therein, a vertical pillar extending through each of said sleeves and through the aligned holes in the respective pairs of said lugs and adjustable rotatably and vertically therein, each of said pillars having a series of vertically spaced holes therein, a locking pin adapted to extend removably through the diametrically-opposed holes in each of said sleeves and through any one of the vertically spaced holes in the respective pillar, left-handed and right-handed implement carrying linkages each comprising a pair of arms connected respectively to the upper and lower ends of the respective pillars and extending rearwardly therefrom and pivotal in respective vertical planes, and a link connecting pivotally the rear ends of the arms of the respective linkage, means for pivoting either of said linkages independently in its respective vertical plane or both linkages cooperatively in their respective vertical planes about their respective connections to the respective rotatable and vertically adjustable pillars, and a part adjustable angularly about each of said links and having means for attaching an implement thereto.

References Cited in the file of this patent

UNITED STATES PATENTS

| | | |
|---|---|---|
| 895,351 | Dromgold | Aug. 4, 1908 |
| 2,244,774 | Hewitt | June 10, 1941 |
| 2,683,404 | Buhr | July 13, 1954 |